United States Patent
Amrany et al.

(10) Patent No.: US 6,192,109 B1
(45) Date of Patent: Feb. 20, 2001

(54) APPARATUS AND METHOD FOR IMPROVED DSL COMMUNICATION

(75) Inventors: Daniel Amrany, Ocean Township; Armando Geday, Atlantic Highlands; Arnold Muralt, Fairhaven; Gabe P. Torok, Holmdel, all of NJ (US)

(73) Assignee: Globespan, Inc., Red Bank, NJ (US)

( * ) Notice: Under 35 U.S.C. 154(b), the term of this patent shall be extended for 0 days.

(21) Appl. No.: 09/219,914

(22) Filed: Dec. 23, 1998

Related U.S. Application Data

(60) Provisional application No. 60/068,676, filed on Dec. 24, 1997.

(51) Int. Cl.$^7$ ............................................ H04M 1/24
(52) U.S. Cl. .................... 379/30; 379/6; 379/27; 370/248; 370/494; 375/222
(58) Field of Search ................. 379/1–2, 26, 27, 379/28, 29, 32, 34, 6, 30; 375/222, 224, 225, 228; 370/433, 468, 493, 494, 495, 248, 484, 487, 522

(56) References Cited

U.S. PATENT DOCUMENTS

| | | | |
|---|---|---|---|
| 5,668,857 | 9/1997 | McHale | 379/98 |
| 5,757,803 | * 5/1998 | Russell et al. | 370/494 |
| 5,781,617 | 7/1998 | McHale et al. | 379/93.14 |
| 5,805,669 | * 9/1998 | Bingel et al. | 379/28 |
| 5,852,655 | 12/1998 | McHale et al. | 379/93.14 |
| 6,014,425 | * 1/2000 | Bingel et al. | 379/27 |
| 6,021,167 | * 2/2000 | Wu | 375/354 |
| 6,061,392 | * 5/2000 | Bremer et al. | 375/222 |
| 6,061,427 | * 5/2000 | Ryoo | 379/1 |
| 6,091,713 | * 7/2000 | Lechleider et al. | 370/248 |

* cited by examiner

*Primary Examiner*—Curtis A. Kuntz
*Assistant Examiner*—Binh K. Tieu
(74) *Attorney, Agent, or Firm*—Thomas, Kayden, Horstemeyer & Risley

(57) ABSTRACT

The present invention is generally directed to an xDSL modem that is capable of transmitting at multiple data rates. Specifically, the xDSL modem is configured to generally transmit at a high data rate (typically the highest data rate supported by the line), but will reduce its data transmission rate in response to one or more sensed conditions. In this regard, it has been found that transmitting at a data rate that is low enough to avoid significant corruption, and thus retransmission, achieves a higher overall data transmission rate than that which is achieved if re-transmissions are required. Further, various conditions may be sensed that will prompt the xDSL modem to alter its transmission rate, including detecting an unfiltered POTS device going Off-Hook. In accordance with one aspect of the present invention, at modem startup, the Off-Hook condition and other line problems are detected by direct measurement of the line impedance. Given a first impedance measurement in which the impedance is approximately equal to the impedance of the typical twisted-pair loop, the digital signal processor (DSP) of the present invention is able to detect that either all phones are on hook or that any Off-Hook equipment is protected with micro data filters. In response to this detected line condition, the xDSL communication is transmitted at the highest data rate supported by the transmission line.

25 Claims, 6 Drawing Sheets

APPARATUS AND METHOD FOR IMPROVED DSL COMMUNICATION

CROSS-REFERENCE TO RELATED APPLICATIONS

This application claims the benefit of U.S. Provisional Patent Application Serial No. 60/068,676, filed on Dec. 24, 1997, and entitled Method for Determining Off-Hook Condition of a Telephone.

BACKGROUND OF THE INVENTION

1. Field of the Invention

The present invention generally relates to telecommunication devices, and more particularly to an apparatus and method for providing improved DSL communication in an environment wherein both POTS and DSL communications occur over a shared two wire pair.

2. Discussion of the Related Art

In recent years telephone communication systems have expanded from traditional plain old telephone system (POTS) communications to include high-speed data communications as well. As is known, POTS communications includes not only the transmission of voice information, but also PSTN (public switched telephone network) modem information, control signals, and other information that is transmitted in the POTS bandwidth, which extends from approximately 300 hertz to approximately 3.4 kilohertz.

Prompted largely by the growth in Internet usage, the provision of xDSL services to customer premises has proliferated over recent years. In this regard, the descriptor "x" preceding the DSL designator is used to broadly denote a variety of DSL services, including ADSL, RADSL, HDSL, etc. As is known, xDSL transmissions are sent to customer premises over the same twisted pair cabling as POTS transmission are sent. Since xDSL transmissions are communicated in a frequency band that is separate and distinct from the POTS frequency band, transmitting both types of signals over the same cabling (even at the same time), generally is not a problem. Specifically, the POTS frequency band is defined between approximately DC and approximately 4 kHz, while xDSL frequency bands (although they vary depending upon the specific service) are generally defined by a lower cutoff frequency of approximately 26 kHz, and an upper cutoff frequency that depends upon the particular xDSL service.

However, it is known that some measure of additional protection is generally necessary, when the communications occur simultaneously. In this regard, a person speaking into a telephone handset will generally observe audible noise over the handset, even though the xDSL signals are at frequencies above the audible range. It has been generally determined that this audible noise is a result of circuit components within a telephone handset reacting with the xDSL signals to generate lower frequency noise signals, also called intermodulation products. Therefore, some level of additional protection must be provided in order to satisfactorily transmit both POTS information and xDSL signals at the same time.

This additional protection is usually provided by placing a POTS filter at the customer premises. As the name suggests, a POTS filter is a low pass filter that rejects signals at frequencies higher than the POTS frequency band (thus filtering the POTS band signals). Likewise, most xDSL equipment includes a front-end high-pass filter to reject lower frequency POTS signals (as POTS signals tend to distort the xDSL signals by clipping at the analog to digital converter). In this way, xDSL signals are isolated from the POTS signals, which can then be individually routed to the appropriate locations at the customer premises. There are, however, at least two specific manners in which the POTS filter is provided at the customer premises.

First, the local loop is often tapped at the point of entry into the customer premises, and the POTS filter placed at the point of entry. The output of the POTS filter can then be electrically connected to the wiring entering the premises so that all jacks within the premises receive the protection of the POTS filter. Unfortunately, since dual lines are generally not prewired at a customer premises, the second line carrying the xDSL signals must be routed into the customer premises (which may require drilling through walls or other measures). Sometimes this does not pose a significant problem, particularly when the xDSL line need only be routed to a single location that is relative easy to route the line. However, if access to the xDSL service is desired at multiple locations within the customer premises, then the routing of the signal lines will become more tedious, time consuming, and expensive.

A second, relatively simple solution to implement is to provide a POTS filter at every location within the customer premises supporting POTS equipment (e.g., telephones, facsimile machines, PSTN modems, etc.). This filter may be provided in a single housing that plugs into the jacks (e.g. RJ-11 jack). Thus, such a filter will need to be provided for every telephone used in the premises. While simple to implement, this solution certainly imposes a significant cost burden on the customer.

Even though it is a relatively simple task to install individual filters at all POTS devices within a customer premises, it has been found that this is often not done. Whether the reason is cost, difficulty in obtaining filters, or some other reason, often customer premises are equipped with xDSL devices that share a common two wire pair with POTS devices, without any protection beyond the natural protection provided by the dead band that separates POTS from xDSL.

Some users may not install individual POTS filters because they do not hear noise (i.e., intermodulation products) from xDSL devices. That is, if the interference from the xDSL device(s) is not manifest as "audible" noise to a user on a POTS device (e.g., telephone), then the user often does not believe that any extra protection is necessary. However, frequently the dead band separation is not sufficient, even though audible noise is not manifest on POTS devices. For example, lower frequency POTS signals may interfere with xDSL band, thereby corrupting xDSL transmissions. When data is being transmitted, and it gets corrupted, error correction techniques will correct the problem. Typically, however, this correction is in the form of identifying corrupted blocks, and re-transmitting those blocks. Unfortunately, this results in a lower overall data transmission rate.

Accordingly, an improved apparatus and method are desired that overcome the above shortcomings of the prior art. Namely, an improved xDSL communications device that achieves a higher overall data rate when POTS communications are taking place simultaneously over a shared two pair.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to an xDSL modem that is capable of transmitting at multiple data rates. Specifically, the xDSL modem is configured to generally transmit at a high data rate (typically the highest data rate supported by the line), but will reduce its data transmission rate in response to one or more sensed conditions, including detecting an unfiltered POTS device going Off-Hook or, going back On-Hook In accordance with the present invention, at modem startup, the transmit signal power is determined that will not result in unacceptable signal distortion and intermodulation products causing a degradation of the xDSL data communication or audible noise in the receiver. This maximum permissible transmit signal power is determined by transmitting a single- or multi-tone test signal, or any other signal compatible with applicable xDSL standards and monitoring distortion and intermodulation products. The test signal level is initially set to a value that is known to be very unlikely to cause distortion or intermodulation products. The signal level is subsequently increased steps, e.g., 1 dB. At each signal level, the received signal is examined for the presence of distortion and intermodulation products. The process is stopped when distortion or intermodulation products are found to exceed a previously defined level and the transmit signal power is reduced accordingly.

In accordance with the present invention, at modem startup, the Off-Hook condition and other line problems are detected by direct measurement of the line impedance. The impedance measurement may be combined with the level measurement as the two measurements can use the same test signal. Given a first impedance measurement in which the impedance is approximately equal to the impedance of the typical twisted-pair loop, the digital signal processor (DSP) of the present invention is able to detect that either all phones are on hook or that any Off-Hook equipment is protected with micro data filters. A micro data filter is a passive, low-pass filter that passes voice band but rejects an xDSL signal.

In response to this detected line condition, the xDSL communication is transmitted at the highest data rate supported by the transmission line. Given a second impedance measurement, in which the measured impedance is lower (e.g., 50%) than the line impedance of typical twisted pair loops, the DSP of the present invention is able to detect that at least one unprotected POTS device is Off-Hook. In response to this line condition, a lower transmit rate is used in order to avoid interfering with the Off-Hook equipment. Given a third impedance measurement, in which the impedance is significantly larger than the impedance of the typical twisted pair loops, the DSP of the present invention is able to detect that the transceiver is not connected properly. In this case, the DSP will transmit the available data at the highest possible rate and wait for a response. If no response is received within a reasonable time period, the transmission will be terminated. Given a final impedance measurement in which the impedance is close to zero Ohms, the system of the present invention is able to detect that the connections of the transceiver are short-circuited. In this case, the DSP will transmit the available data at the highest possible rate and wait for a response. If no response is received within a reasonable time period, the transmission will be terminated. In this instance, the transmission termination is critical, since continued transmission may damage the line driver. In addition to capabilities discussed above, the DSP of the present invention is also capable of sending appropriate status messages to the host computer (PC) and the user to indicate the line problems discussed above. In accordance with the present invention, during operation of the xDSL modem, the DSP continuously monitors the echo and received signal levels, available signal-to-noise ratio, or other signal features, and compares the monitored features with reference values stored at modem startup. If the echo, received signal level, signal-to-noise ratio, or other signal feature changes suddenly, this is an indication to the transceiver DSP that an unprotected phone was taken Off-Hook, or put back to the On-Hook position. In response to this indication, transceiver DSP performs a restart and adjusts the transmit level, reference impedance, and matching impedance according to the line conditions. By matching the internal transceiver impedance to the line impedance, the present invention is able to improve the transhybrid loss and to get better rejection of the unwanted echo signals. The transhybrid loss is the frequency dependent loss incurred by the echo signal when it passes through the hybrid from the transmitter output to the receiver input. Generally, the hybrid will be designed to maximize the transhybrid loss, thereby minimizing the echo signal level or power.

DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Figure 1:
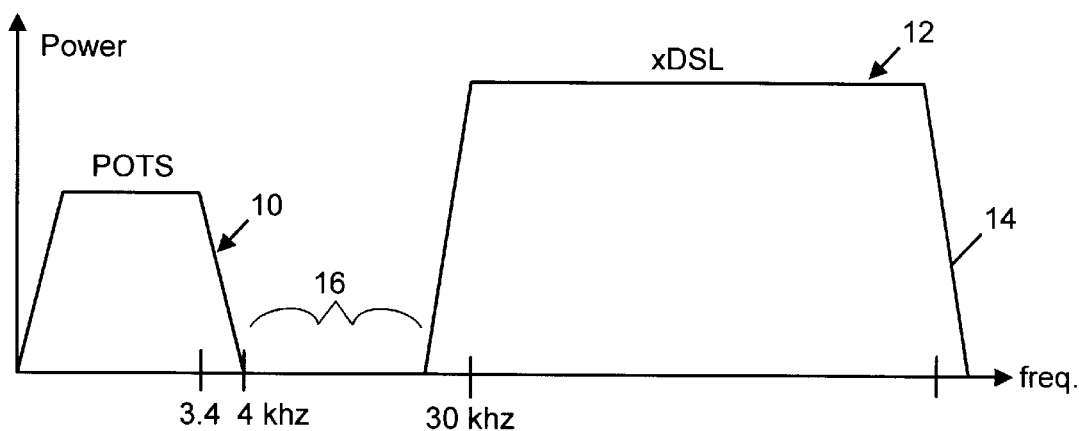
FIG. 1 is an illustration of the spectrum allocation for both POTS and xDSL signals.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

FIG. 1 shows the spectrum allocation for both POTS and xDSL signals. Specifically, the graph is a plot of frequency on the horizontal axis and power on the vertical axis. As is known, the POTS frequency band 10 generally extends from approximately DC to approximately 3.4 kilohertz. The xDSL frequency band 12 generally extends from approximately 26 kilohertz up to an upper boundary 14, which varies depending upon the particular digital subscriber line technology utilized. A separation or guard band 16 provides some margin of signal separation, and thus noise and crosstalk immunity between signal transmissions between the POTS 10 and xDSL 12 frequency bands.

Figure 2:
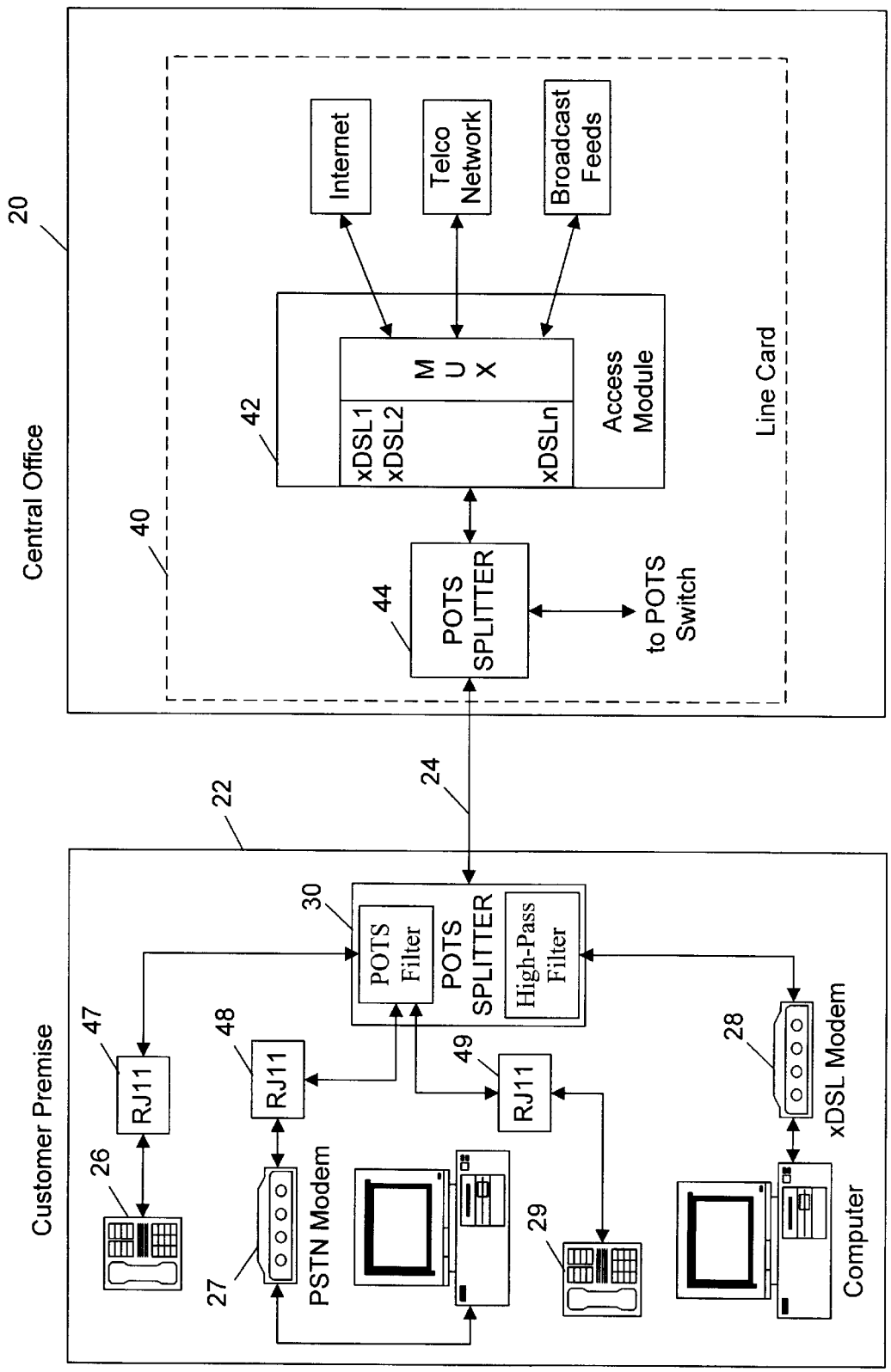
FIG. 2 is a block diagram illustrating the electrical connectivity at a customer premises, as is known in the prior art.

Referring now to FIG. 2, a prior art communication system is shown. Specifically, FIG. 2 illustrates communication between a central office 20 and a customer premises 22 by way of local loop 24. At the central office 20, additional circuitry is provided. Generally, a line card 40 (denoted by dashed lines) containing line interface circuitry is provided for electrical connection to the local loop 24. One or more xDSL modems, including both receiver and transmitter circuitry, are embodied in an access module, denoted by block 42. This circuitry is directly connected for communications across the local loop 24. The remaining POTS circuitry is separated, or buffered, from the local loop 24 by a POTS filter contained within the POTS splitter 44.

While the customer premises 22 may be a single dwelling residence, a small business, or other entity, it is generally characterized as having POTS equipment, such as telephones 26, 29, PSTN modem 27, fax machine (not shown), etc. The customer premise 22 may also include an xDSL communication device, such as an xDSL modem 28. When an xDSL service is provided, a POTS splitter 30 is interposed between the POTS equipment (e.g., 26, 27, 29) and the local loop 24. As is known, the POTS splitter 30 includes a low-pass filter having a cut-off frequency of approximately 4 to 10 kilohertz, in order to filter high frequency transmissions from the xDSL communication device 28 and protect the POTS equipment.

As illustrated, and as is known, in a typical customer premises, a plurality of RJ11 jacks 47, 48, and 49 are provided throughout the customer premises. These are typically interconnected, and originate from the point of entry into the customer premises. In the illustration of FIG. 2, each originate from the low-pass POTS filter (within POTS splitter 30), which is provided at the point of entry. Any POTS communication device may be directly plugged into any of these predisposed jacks 47, 48, and 49.

Figure 3:
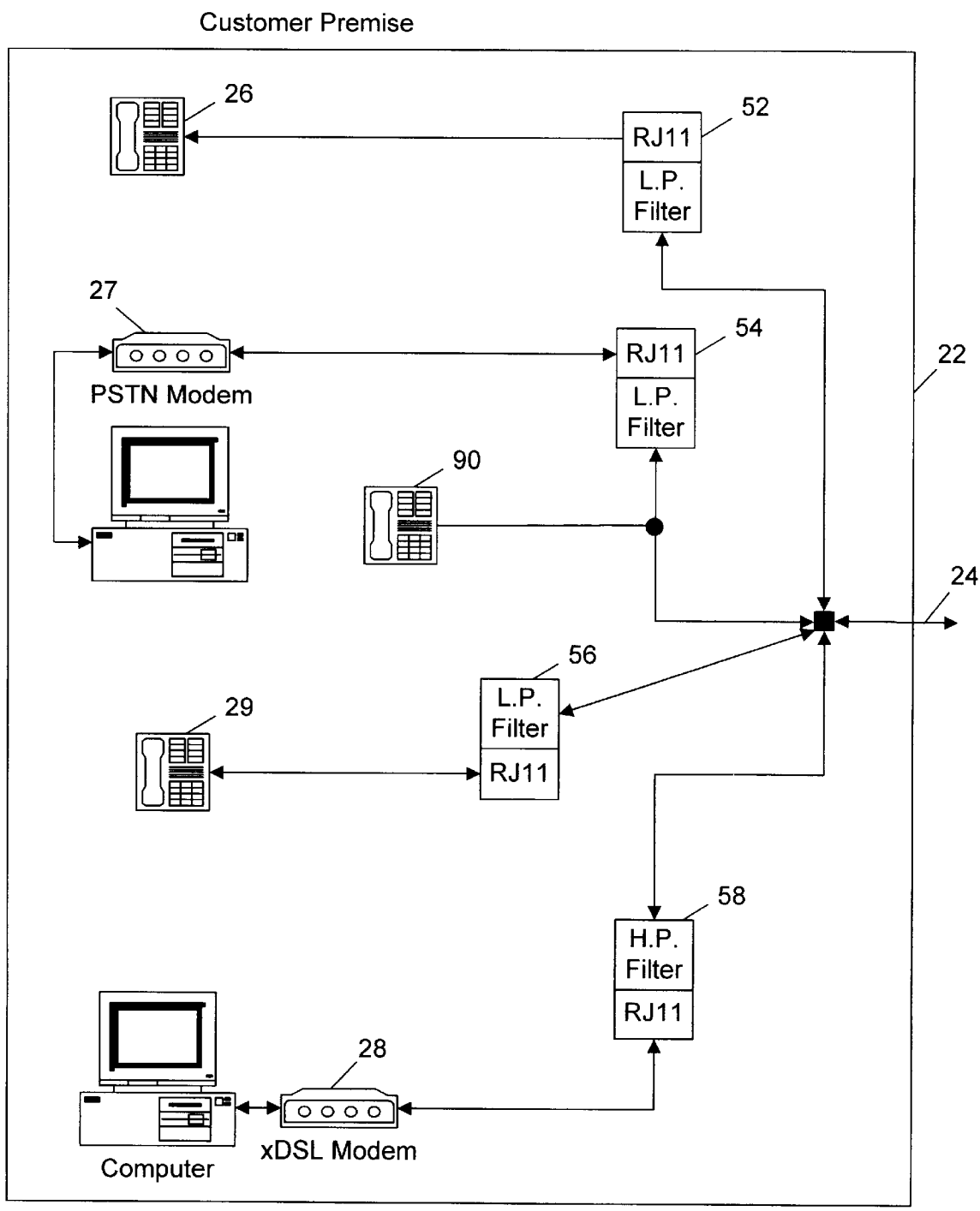
FIG. 3 is an illustration of the communication between a central office and a customer premise.

Referring now to FIG. 3, a block diagram is shown illustrating the electrical connectivity at a customer premises, according to the present invention. Significantly, the central POTS splitter 30 (FIG. 2) is eliminated. Not only does this eliminate a component that adds to the system cost, but it also avoids the necessity of undertaking extensive drilling and wiring of a customer premises, to run xDSL signal cabling.

The prior art system of FIG. 2 may be modified as illustrated in FIG. 3, by providing a micro-miniature POTS filter as a part of a POTS telephone, or in a connector that may plug between a standard POTS telephone and a RJ11 jack. One embodiment provides a connector 52, 54, 56 that includes a low-pass filter characterized by a low-pass cut-off frequency that is above the POTS frequency band, but below the lower end of xDSL transmissions. As illustrated, anywhere there is a POTS communication device 26, 27, 29, a connector 52, 54, 56 having a low-pass filter may be provided. This permits proper operation of the POTS communication device, without interference from, or with, the xDSL device. Also, as is shown, a high pass filter may be combined in a connection, to add similar protections and accuracy to the xDSL modem 28. If, however, the xDSL modem 28 includes an internal high pass filter, then such a filter need not be separately provided.

As will be appreciated, the implementation of micro data filters (low pass filters) at each POTS device provides a vast improvement over the prior art, in that the need for separately running a set of wiring for xDSL communications need not be performed. It also, advantageously, eliminates the need for an expensive POTS splitter 30 (FIG. 2) at the point of entry into the customer premises. However, and as is known, this is often not done. Accordingly, FIG. 3 illustrates a customer premises wherein a phone 90 has been directly connected to the wiring without separating the phone 90 with a filter element. Accordingly, without the protections and benefits of the present invention, communications over the phone 90 at the same time as data communications from or to the xDSL modem 28 would result in noise at the telephone 90 handset.

In accordance with one aspect of the invention, the present invention provides a scheme for using a signal and impedance monitoring algorithm for determining whether a telephone 90 without a POTS filter is placed Off-Hook. Such a condition alters the echo signal level, the signal quality, or other defined signal feature used for xDSL data communication. Accordingly, a system according to the present invention senses this condition, and adjusts signal levels and bandwidth for compatibility between POTS equipment and DSL equipment on the premises.

In installations with several telephones sharing a phone line with DSL equipment, and as shown in FIG. 3, it is desirable to place filters between the phone line and each telephone for eliminating possible interference between phones and DSL equipment. In some cases, such as a wall phone it may be difficult to have a customer install a filter between the phone and the line. In general, significantly higher DSL data rates can be achieved with the filters than without the filter. This is particularly true when a telephone without a filter is in the Off-Hook mode. Therefore, it is desirable to use maximum data rates when the phone without filter is in the on-hook mode and fall back to a lower data rate when that phone goes Off-Hook.

This invention utilizes the fact that Off-Hook unfiltered phones, compared to low-pass filtered phones, produce significant changes in the impedance of the transceiver. The change in transceiver impedance will in turn produce significant changes in the received and echo signal levels. The change can be detected by either monitoring the respective signal levels and signal features in the time and frequency domain. When the unfiltered phones are on-hook, the DSL device will operate at the highest speed supported by the line. This high rate of transmission will be maintained regardless of whether a filtered phone (or phones) is on or Off-Hook. When an unfiltered phone is in the Off-Hook position, the change in impedance is detected and the transceiver's DSL is placed in a mode where transmission power and speeds are compatible with the presence of the Off-Hook phone. Therefore, eliminating any interference between the DSL and phone communications.

Figure 4:
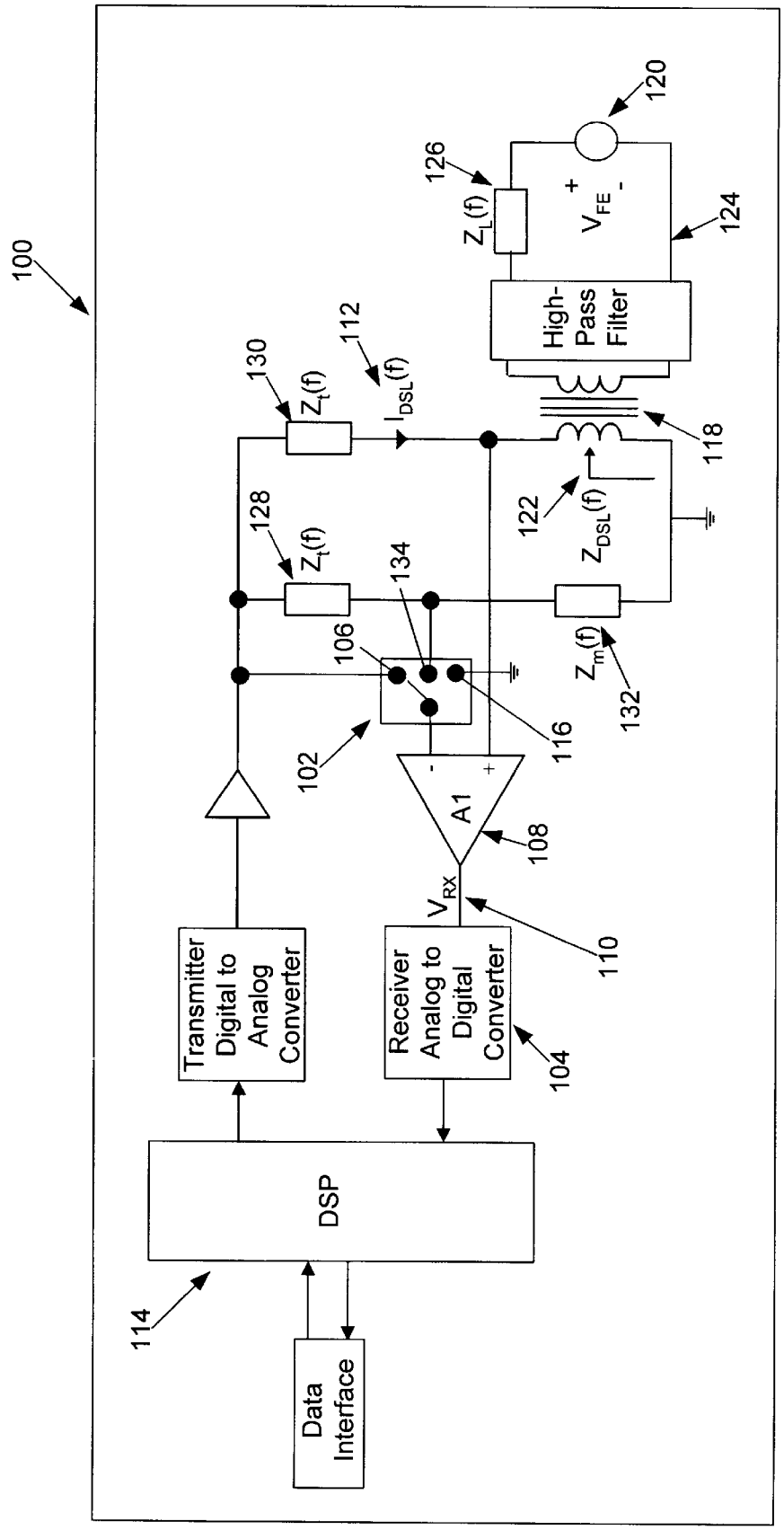
FIG. 4 is a schematic diagram of simplified Analog Front End (AFE) with a measurement switch.

In accordance with the preferred embodiment of the present invention, during transceiver startup, the Analog Front End Circuitry 100 of FIG. 4 is utilized to directly measure the impedance of the transmission line. The direct impedance measurements are conducted by manipulating switch 102 and measuring the representative output voltage at the output of the analog to digital converter 104 with a system controller, which could be implemented in a variety of ways, but in the preferred embodiment is a digital system processor (DSP) 114. During normal operation, the switch 102 is placed in position 134. The impedance measurements of the present invention are preferably performed at a low signal level that is unlikely to interfere with any connected telephone equipment. Either a single tone or a multi-tone can be used as test signal for the impedance measurement. With a single tone, the impedance at that respective frequency is measured. Use of a multi-tone signal allows one to determine the impedance simultaneously at a number of frequency points corresponding to the tones present in the test signal.

In a first impedance measurement, switch 102 is manipulated to position 106. With switch 102 in position 106, the voltage 110 at the amplifier 108 output is given by the equation:

$$V_{RX,1}=Z_t \cdot I_{DSL}, \qquad \text{Equation 1}$$

In Equation 1, the receiver voltage is directly proportional to the direct signal line current 112 or $I_{DSL}$. Also, since $|Z_t| \approx |Z_{DSL}|$, the measured voltage is approximately $V_{TX}/2$.

In a second impedance measurement, switch 102 is manipulate by the DSP 114 to position 116. With switch 102 in position 116, the voltage at the amplifier 108 output equals the voltage across the line transformer 118 and is given by the equation:

$$V_{RX,2}=Z_{DSL} \cdot I_{DSL}+V_{FE}, \qquad \text{Equation 2}$$

In practice, because of the large loop attenuation, the far end signal 120 or $V_{FE}$ is very small compared to the first term in Equation 2. Therefore, far end signal 120 or $V_{FE}$ can be neglected and impedance 122 or $Z_{DSL}$ is given by the equation:

$$Z_{DSL} = Z_t \cdot \frac{V_{RX,2}}{V_{RX,1}}, \qquad \text{Equation 3}$$

Using the derived value of $Z_{DSL}$ within the passband of the high-pass filter, the impedance of the transmission line is approximately:

$$Z_L = n^2 \cdot Z_{DSL}, \qquad \text{Equation 4}$$

where n is the turns ratio of the line transformer 118. Therefore, from equation 4 it is possible to accurately measure the impedance in the twisted-pair loop 124, in the wiring at the customer premise (shown in FIG. 3), and connected phones within the xDSL signal band (shown in FIG. 3).

In accordance with another aspect of the present invention, after the direct impedance measurements are completed and the line impedance has been determined, the transceiver DSP 114 will execute specific instructions based on the measured line impedance value 126. In a first instance, where the line impedance measurement is approximately equal to the impedance of typical twisted-pair loops, the DSP 114 will accept the impedance value as an indication that either all phone equipment is on hook or is protected with low pass or micro data filters 56 (FIG. 3). In this case, the DSP 114 will transmit the available data at the highest available transfer rate. In a second instance, where the measure line impedance is lower (e.g., 50%) than the impedance of a typical twisted pair loops, the DSP 114 accepts the impedance value as an indication that at least one unprotected phone is Off-Hook. In this case, the available data is transmitted a lower rate than the highest available transfer rate. In a third instance, where the measured impedance is significantly greater than the typical impedance of a twisted pair loop, the DSP 114 accepts this impedance measurement as an indication that the transceiver has not been connect properly. In this case, the DSP 114 will transmit the available data at the highest possible rate and wait for a response. If no response is received within a reasonable time period, the transmission will be terminated. In the final instance, where the measured impedance is close to zero ohms compared to the typical impedance of a twisted pair loop, the DSP 114 accepts this impedance measurement as an indication that the connections of the transceiver are short-circuited. In this case, the DSP 114 will transmit the available data at the highest possible rate and wait for a response. If no response is received within a reasonable time period, the transmission will be terminated. In this case, the transmission termination is critical, since continued transmission may cause damage to the line driver (not shown).

In a further embodiment of the present invention, the DSP 114 will be configured to send the appropriate status messages to the host computer (not shown) and user indicating the line problems detected by the DSP 114. In addition, once the line impedance is determined and accepted as a condition where there is Off-Hook phone equipment or at least one unfiltered phone is Off-Hook, the appropriate impedance (i.e., reference impedance 128 and 130 or the matching impedance 132) within the transceiver 100 will be selected to match the line impedance 126. By matching the transceiver internal impedance to the line impedance, the present invention is able to improve trans-hybrid loss, and thereby reduce the signal echo of the transceiver and get better rejection of unwanted echo signals. All parameter values (within the DSP and within the AFE) can be stored for future reference when another change in the line condition occurs. In particular, a set of parameter values can be associated with each particular loop condition. This enables the transceiver to restart more quickly than would otherwise be possible.

Figure 5:
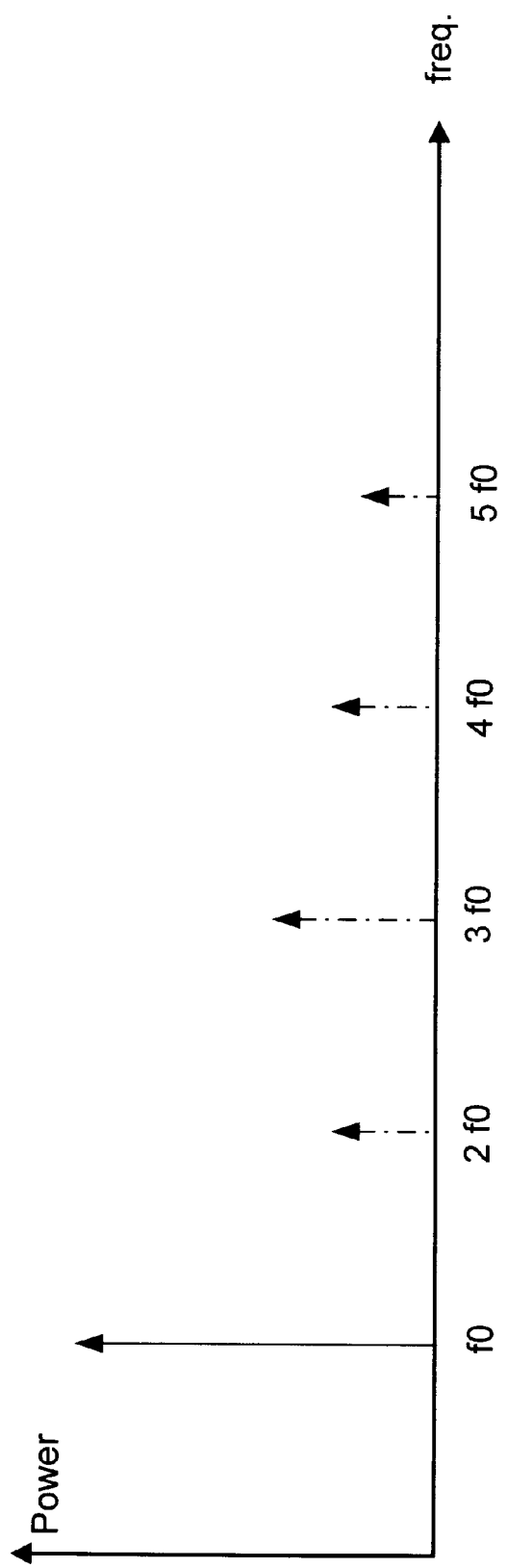
FIGS. 5 and 6 are graphs illustrating additional frequency components generated by distortion and inter-modulation products.
Figure 6:
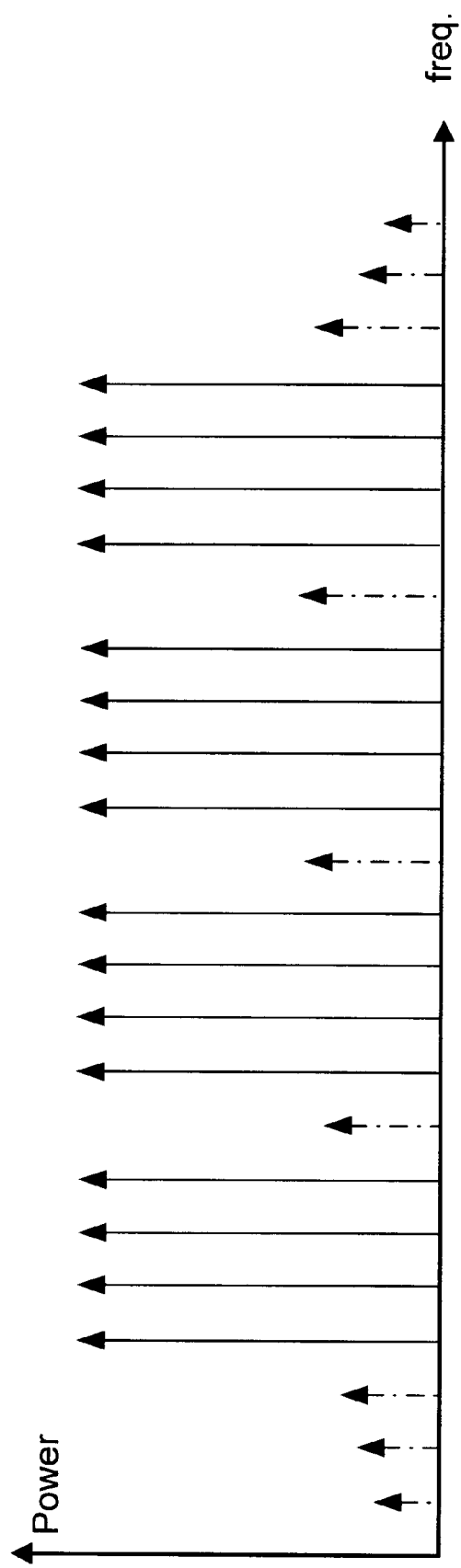

At startup, the distortion and inter-modulation products can be detected by transmitting a test signal. The test signal can be a single tone or multi-tone signal composed of a number of tones with frequencies within the xDSL signal band and with a variable amplitude. Neglecting the effects of the far end received signal, the signal at the output of amplifier 108 will have the same spectral characteristics as the test signal unless telephone equipment with non-linear impedance characteristics are connected to the same phone lines as the xDSL transceiver. Distortion and inter-modulation products generated by the telephone equipment will result in additional frequencies components as shown in FIGS. 5 and 6 (additional frequency components illustrated by dashed lines). These components can be detected using a number of different means, including a filter bank or a Fourier transform.

In order to determine the maximum signal level that can be transmitted without causing unacceptable distortion and intermodulation products, the test signal amplitude is initially set to a (low) value that is known to cause any significant distortion or intermodulation products. The test signal amplitude is subsequently increased while distortion and intermodulation products are continuously monitored by the DSP program. The process is stopped when the DSP detects distortion and intermodulation products that exceed a predefined level. The transmit signal level is then limited to a value less than the critical value as determined above.

After startup, during normal operation of the xDSL modem, the DSP 114 continuously estimates the echo and transmitted signal levels, and available signal-to-noise ratio, to compare these values with reference values stored at startup. The estimated values generated by DSP 114 are a result of the indirect measurement of the AC impedance of transceiver 100. As a result of positioning switch 102 into position 134, an indirect AC impedance measurement can be derived from the voltage 110 at amplifier 108. Voltage 110 is given by the equation (assuming n=1):

$$V_{RCV}(f) = \underbrace{\frac{Z_t(f)}{Z_L(f) + Z_t(f)} \cdot V_{FE\ XMT}(f)}_{Signal} + \underbrace{\frac{Z_t(f)}{Z_m(f) + Z_t(f)} \cdot \frac{Z_L(f) - Z_m(f)}{Z_L(f) + Z_t(f)} \cdot V_{XMT}(f)}_{Echo}.$$

Equation 5

As is evident from Equation 5, any variation of the line impedance $Z_L$ presented towards the xDSL transceiver will significantly change the received and echo signal levels. These changes can be detected by either monitoring the echo signal in the time domain (e.g., by measuring and comparing the RMS or peak levels) or in the frequency domain by measuring and comparing the magnitude and/or the phase of selected frequency components) using DSP 114. When DSP 114 detects that any or a combination of the monitored echo signal features changes suddenly, the DSP 114 will accept this change as an indication that an unfiltered phone was taken Off-Hook, or if the modem was already operating in off-hook state, that either the phone was placed on-book or that an additional unfiltered phone has been take of hook As a result of this indication, the DSP 114 will initiate a restart, using the startup procedure discussed above, in order to the determine the maximum signal level and/or to adjust the internal transceiver impedance to match the changed line impedance. If the transceiver has stored parameter values that match the detected line condition, the restart operation can be accelerated significantly by loading the stored parameters into the DSP and AFE.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. An xDSL modem comprising:
    a transceiver configured to transmit and receive data over a communication line;
    a circuit module within said transceiver configured to directly and indirectly measure an impedance of the communication line;
    a transceiver controller for controlling xDSL transmissions, said transceiver controller providing:
        a first adjustment, based on said communication line impedance, to a signal level used in reception to and from the transceiver;
        a second adjustment, based on an indirect measurement of said communication line impedance with said circuit module, to said signal level used in reception to and from said transceiver.

2. The xDSL modem as defined in claim 1, wherein said first adjustment is to a signal level that is the highest supported by said communication line.

3. The xDSL modem as defined in claim 1, wherein said first adjustment is to a lower signal level than said signal level that is the highest supported by said communication line.

4. The xDSL modem as defined in claim 2, wherein said communication line is a two-wire pair.

5. The xDSL modem as defined in claim 1, wherein a change in said communication line impedance is caused by an Off-Hook condition of a POTS device sharing said communication line.

6. The xDSL modem as defined in claim 1, wherein said communication line impedance is higher than a typical twisted pair line impedance and said first adjustment is to said signal level that is the highest supported by said communication line.

7. The xDSL modem as defined in claim 6, wherein said first adjustment is to said signal level that is the highest supported by said communication line and is maintained for a specified period of time in order to determine an appropriate signal level for communications.

8. The xDSL modem as defined in claim 1, wherein said communication line impedance is lower than said typical twisted pair line impedance and said first adjustment is to said signal level lower than said signal level that is the highest supported by said communication line.

9. The xDSL modem as defined in claim 1, wherein said communication line impedance is approximately equal to said typical twisted pair line impedance and said first adjustment is to said signal level that is the highest supported by said communication line.

10. The xDSL modem as defined in claim 1, wherein said communication line impedance is close to zero compare with said typical twisted pair line impedance and said first adjustment is to said signal level that is the highest supported by said communication line.

11. The xDSL modem as defined in claim 10, wherein said first adjustment is to said signal level that is the highest supported by said communication line and is maintained for said specified period time in order to determine said appropriate signal level for transmission over said communication line.

12. The xDSL modem as defined in claim 1, wherein said transceiver has a plurality of frequencies, which are associated with a plurality of distortion and inter-modulation products, that are detected to determine said signal level that is the highest supported by said communication line.

13. A method for transmitting xDSL communications comprising the steps of:
    configuring a transceiver to transmit and receive data over a communication line;
    configuring a circuit module within said transceiver to directly and indirectly measure an impedance of the communication line;
    controlling xDSL transmissions with a transceiver controller by:
        providing a first adjustment, based on said communication line impedance, to a signal level used in reception to and from said transceiver;
        providing a second adjustment, based on an indirect measurement of said communication line impedance with said circuit module, to said signal level used in reception to and from said transceiver.

14. The method of claim 13, further comprising the step of providing said first adjustment to a signal level that is the highest supported by said communication line.

15. The method of claim 13, further providing the step of providing said first adjustment to a lower signal level than said signal level that is the highest supported by said communication line.

16. The method of claim 13, further comprising the step of directly and indirectly measuring said communication line impedance that is caused by an Off-Hook condition of a POTS device sharing said communication line.

17. The method of claim 13, further comprising the step of determining said communication line impedance to be higher than a typical twisted pair line impedance and providing said first adjustment to said signal level that is the highest supported by said communication line.

18. The method of claim 17, further comprising the step of maintaining said signal level that is the highest supported by said communication line for a specified period of time in order to determine an appropriate signal level for communications.

19. The method of claim 13, further comprising the step of determining said communication line impedance to be lower than said typical twisted pair line impedance and providing said first adjustment to a signal level lower than said signal level that is the highest supported by said communication line.

20. The method of claim 13, further comprising the step of determining that said communication line impedance is approximately equal to said typical twisted pair line impedance and providing said first adjustment to said signal level that is the highest supported by said communication line.

21. The method of claim 13, further comprising the step of determining that said communication line impedance is close to zero compared to said typical twisted pair line impedance and providing said first adjustment to said signal level that is the highest supported by said communication line.

22. The method of claim 21, further comprising the step of maintaining said signal level that is the highest supported by said communication line for said specified period of time in order to determine said appropriate signal level for transmission over said communication line.

23. The method of claim 13, further comprising the step of determining said signal level that is the highest supported by said communication line by measuring a plurality of frequencies produced by a test signal's plurality of distortion and inter-modulation products.

24. A method for establishing the power level of a digital subscriber line (DSL) modem transmit signal comprising the steps of:

determining a maximum permissible transmit power by transmitting at least one of a single-tone and multiple-tone test signal and monitoring distortion and inter-modulation products, wherein the at least one test signal is initially set to a value that is known to be unlikely to cause one of distortion and intermodulation products;

setting, at modem startup, the maximum transmit signal power at a level that will not result in unacceptable signal distortion and intermodulation products causing a degradation of the xDSL data communication or audible noise in the receiver;

increasing, in steps, the power level of the transmit signal;

examining the received signal at each incremental signal level for the presence of at least one of distortion and intermodulation products;

determining when at least one of the distortion and intermodulation products exceeds a defined level; and reducing the transmit signal power by at least the amount that the power level is increased in the increasing step.

25. A method for improving transhybrid loss comprising the steps of:

continuously monitoring, during operation after startup, an echo and received signal levels, and a signal-to-noise ratio;

comparing values of the monitored signals and characteristics with reference values stored at startup;

determining whether sudden changes occur in the monitored signals and characteristics;

performing by a transceiver DSP, a restart operation in which a transmit signal power level, a reference impedance, and a matching impedance are adjusted according to line condition, where an internal transceiver impedance is matched to a measured line impedance.

* * * * *